(12) United States Patent
Hara et al.

(10) Patent No.: US 8,461,251 B2
(45) Date of Patent: Jun. 11, 2013

(54) METHOD FOR PRODUCING FLUOROOLEFIN COPOLYMER SOLUTION AND METHOD FOR PRODUCING COATING COMPOSITION

(75) Inventors: Yuji Hara, Tokyo (JP); Kiyoshi Kasahara, Tokyo (JP); Shou Masuda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 7 days.

(21) Appl. No.: 13/186,730

(22) Filed: Jul. 20, 2011

(65) Prior Publication Data

US 2011/0275753 A1 Nov. 10, 2011

Related U.S. Application Data

(63) Continuation of application No. PCT/JP2010/052559, filed on Feb. 19, 2010.

(30) Foreign Application Priority Data

Feb. 23, 2009 (JP) .................................. 2009-039433

(51) Int. Cl.
*C09D 127/12* (2006.01)
(52) U.S. Cl.
USPC ........... 524/544; 524/851; 524/770; 524/755; 524/773; 524/765
(58) Field of Classification Search
USPC .................. 524/544, 851, 770, 755, 773, 765
See application file for complete search history.

(56) References Cited

U.S. PATENT DOCUMENTS

| 7,919,557 B2* | 4/2011 | Sumi et al. ..................... 524/544 |
| 2009/0239993 A1* | 9/2009 | Sumi et al. ..................... 524/544 |
| 2010/0190917 A1* | 7/2010 | Sumi et al. ..................... 524/545 |
| 2010/0331482 A1* | 12/2010 | Saito et al. ..................... 524/588 |

FOREIGN PATENT DOCUMENTS

| CN | 1467230 A | 1/2004 |
| JP | 61-174210 | 8/1986 |
| JP | 61-174210 A * | 8/1986 |
| JP | 1-197510 | 8/1989 |
| JP | 1-197510 A * | 8/1989 |
| JP | 1-229011 | 9/1989 |
| JP | 2-151608 | 6/1990 |
| JP | 2-151610 | 6/1990 |
| JP | 2-153959 | 6/1990 |
| JP | 3-167214 | 7/1991 |
| JP | 5-163457 | 6/1993 |
| JP | 5-163457 A * | 6/1993 |
| JP | 7-228615 | 8/1995 |
| JP | 2008-528786 | 7/2008 |
| JP | 2009-13299 | 1/2009 |

OTHER PUBLICATIONS

International Search Report issued Jun. 22, 2010 in PCT/JP2010/052559 filed Feb. 19, 2010.
Office Action issued Sep. 10, 2012, in Chinese Patent Application No. 201080008858.2 with English translation.

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

A method for producing a fluoroolefin copolymer solution, gives the copolymer solution good storage stability and suppressed coloration. The method for producing a fluoroolefin copolymer solution includes subjecting at least one fluoroolefin and at least one monomer other than the fluoroolefin to a solution polymerization in an organic solvent in the presence of potassium carbonate and hydrotalcite.

19 Claims, No Drawings

METHOD FOR PRODUCING FLUOROOLEFIN COPOLYMER SOLUTION AND METHOD FOR PRODUCING COATING COMPOSITION

TECHNICAL FIELD

The present invention relates to a method for producing a fluoroolefin copolymer solution and a method for producing a coating composition containing such a fluoroolefin copolymer solution.

BACKGROUND ART

A fluoroolefin copolymer is suitably used as a coating resin. The coating resin is required to have good storage stability in its solution state. Further, such a resin solution is preferably colorless.

Patent Document 1 relates to a method for producing a fluorinated copolymer, and discloses that a monomer mixture comprising a fluoroolefin and an alkyl vinyl ether is copolymerized in a polymerization medium containing a lower alkyl benzene and a component having a boiling point lower than the lower alkyl benzene in the presence of an alkali metal carbonate, whereby the copolymerization reaction can be smoothly proceeded, and storage stability of a varnish containing the formed copolymer can be obtained. As an example of the alkali metal carbonate, potassium carbonate is mentioned.

On the other hand, it is known to use hydrotalcite at the time of producing a fluoroolefin copolymer in order to suppress gelation during the polymerization or to prevent corrosion of a base material by an acid component in the polymer solution (Patent Documents 2 to 4).

Patent Document 2 relates to a method for producing a fluoroolefin copolymer having hydroxy groups and discloses a method wherein a monomer mixture comprising a fluoroolefin and a vinyl ether having a hydroxy group is radical-polymerized in the presence of at least one member selected from a metal oxide, a metal hydroxide and an additive A made of an anion exchange resin. As a preferred example of the metal hydroxide, hydrotalcite is mentioned. It is disclosed that by using the additive A, it is possible to obtain effects to prevent gelation during the polymerization and to prevent an increase in the molecular weight distribution of the formed copolymer.

Patent Document 3 discloses a method wherein a fluoroolefin and another monomer are radical-polymerized in a solution to prepare a polymer solution, and then, the polymer solution is contacted with a basic solid material for neutralization treatment to neutralize an acid component contained in the polymer solution thereby to prevent formation of corrosion inside of a tin can. As an example of the basic solid material, hydrotalcite is mentioned.

In Patent Document 4, it is disclosed that a fluorinated vinyl monomer and another monomer are polymerized in the presence of a basic solid material having an average particle diameter of at most 1 μm to produce a resin composition containing a fluorinated vinyl copolymer and the basic solid material, whereby corrosion can be prevented even in a case where a coating film formed by using such a resin composition, is formed on a metal plate. As an example of the basic solid material, hydrotalcite is mentioned.

PRIOR ART DOCUMENTS

Patent Documents
  Patent Document 1: JP-A-61-174210
  Patent Document 2: JP-A-1-229011
  Patent Document 3: JP-A-1-197510
  Patent Document 4: JP-A-5-163457

DISCLOSURE OF INVENTION

Technical Problem

A coating resin is preferably colorless in its solution state, but the present inventors have found that if potassium carbonate is added during copolymerization as disclosed in Patent Document 1, the obtainable copolymer solution is likely to have coloration, although the storage stability will be improved. Accordingly, a method is desired whereby good storage stability can be attained while suppressing coloration of the copolymer solution, but such a method has not been known.

In Patent Documents 2 to 4, there is no disclosure about storage stability. Further, by a finding by the present inventors, it is not possible to improve the storage stability even if hydrotalcite is added during the copolymerization.

The present invention has been made in view of the above situation, and it is an object of the present invention to provide a method for producing a fluoroolefin copolymer solution, whereby good storage stability of the copolymer solution can be obtained and at the same time, coloration of the solution can be suppressed, and a method for producing a coating composition containing such a fluoroolefin copolymer solution.

Solution to Problem

In order to solve the above problem, the present inventors have conducted an extensive study and as a result, have found that when potassium carbonate and hydrotalcite are permitted to coexist during the copolymerization, it is surprisingly possible to obtain good storage stability of a fluoroolefin copolymer solution and at the same time to suppress coloration. The present invention has been accomplished on the basis of this discovery.

That is, the method for producing a fluoroolefin copolymer solution of the present invention comprises subjecting at least one fluoroolefin (a) and at least one monomer (b) other than the fluoroolefin (a) to a solution polymerization in an organic solvent in the presence of potassium carbonate and hydrotalcite.

The above organic solvent is preferably at least one organic solvent (c) selected from the group consisting of a ketone solvent, an ether/ester solvent and a third-category organic solvent stipulated in Industrial Safety and Health Act. The organic solvent (c) preferably further contains an alcohol solvent having at most 4 carbon atoms.

It is preferred that the total mass of the potassium carbonate and the hydrotalcite is from 0.5 to 10 mass % of the total mass of the fluoroolefin (a) and the monomer (b), and the mass ratio of the potassium carbonate to the hydrotalcite represented by potassium carbonate/hydrotalcite is from 4/96 to 80/20.

It is preferred that at least a part of the monomer (b) is cyclohexyl vinyl ether. Further, it is preferred that at least a part of the monomer (b) is a hydroxyalkyl vinyl ether.

It is preferred that the reaction solution obtained from the solution polymerization is filtrated to remove an insoluble component.

It is preferred that the chromaticity of the fluoroolefin copolymer solution is from 30 to 60% of the chromaticity of a comparative solution obtained by the same production method except that at the time of the solution polymerization, hydrotalcite is not present, while the potassium carbonate is present.

Further, the present invention provides a method for producing a coating composition, which comprises producing a fluoroolefin copolymer solution by the method of the present invention, and then blending another coating material blend component (d) to the obtained fluoroolefin copolymer solution.

Said another coating material blend component (d) is preferably at least one member selected from the group consisting of an organic solvent, a curing agent, a colorant and a resin other than the fluoroolefin copolymer.

Advantageous Effects of Invention

According to the method for producing a fluoroolefin copolymer solution and the method for producing a coating composition containing such a fluoroolefin copolymer, of the present invention, it is possible to obtain good storage stability of the copolymer solution and at the same time to suppress coloration of the solution and coating composition.

DESCRIPTION OF EMBODIMENT

[Fluoroolefin (a)]

The fluoroolefin (a) in the present invention is a compound having some or all of hydrogen atoms bonded to carbon atoms of an olefin hydrocarbon substituted by fluorine atoms. It may have substituent atoms or substituent groups other than fluorine atoms. The number of fluorine atoms contained in the fluoroolefin (a) is preferably 2 or more, more preferably from 2 to 6, further preferably from 3 to 4. When the number of fluorine atoms is 2 or more, the weather resistance of the coating film thereby obtainable will be sufficient.

The fluoroolefin (a) may, for example, be tetrafluoroethylene, chlorotrifluoroethylene, vinylidene fluoride or hexafluoropropylene. Particularly preferred is tetrafluoroethylene or chlorotrifluoroethylene.

The amount of the fluoroolefin (a) to be used for the solution polymerization in the present invention is preferably from 30 to 70 mol %, more preferably from 40 to 60 mol %, further preferably from 45 to 55 mol %, based on the total monomer amount of the fluoroolefin (a) and the monomer (b).

Further, in the fluoroolefin copolymer obtained by the solution polymerization in the present invention, the amount of repeating units based on the fluoroolefin (a) to all repeating units contained in the fluoroolefin copolymer is preferably from 30 to 70 mol %, more preferably from 40 to 60 mol %, further preferably from 45 to 55 mol %.

When the fluoroolefin (a) is at least 30 mol %, the weather resistance will be good, and when it is at most 70 mol %, the solubility in a solvent or diluent will be good.

[Monomer (b) Other than Fluoroolefin]

In the present invention, the monomer (b) is a monomer other than the fluoroolefin (a) and is a monomer having a double bond copolymerizable with the fluoroolefin (a).

Specifically, the monomer (b) is preferably a monomer having a structure of the following formula 1.

    Formula 1

(wherein X is a hydrogen atom or a methyl group, n is 0 or 1, Q is an oxygen atom, a group represented by —C(O)O— or a group represented by —O(O)C—, R is a $C_{2-20}$ alkylene group which may have a branched structure or cyclic structure, and Y is a hydrogen atom or a crosslinkable functional group.)

The crosslinkable group is preferably a functional group having active hydrogen, such as a hydroxy group, a carboxy group or an amino group, or a hydrolyzable silyl group such as an alkoxysilyl group.

Among monomers (b) having the structure of the formula 1, a monomer (b1) wherein Y is a hydrogen atom is preferably a compound of the formula 1 wherein R is a $C_{2-20}$ alkylene group which may have a branched structure and a cyclic structure. Specifically, it is preferably an alkyl vinyl ether, an alkyl vinyl ester, an alkylallyl ether, an alkylallyl ester or a (meth)acrylic acid ester. The alkyl group in the alkyl vinyl ester or the alkylallyl ester is preferably bonded to a carbon atom of a carbonyl group in an ester bond. Further, a (meth)acrylic acid represents acrylic acid or methacrylic acid.

As specific examples of the monomer (b1), ethyl vinyl ether (EVE), cyclohexyl vinyl ether (CHVE), 2-ethylhexyl vinyl ether (2EHVE), etc. are preferred.

Especially, it is more preferred that the monomer (b) contains cyclohexyl vinyl ether (CHVE), since the obtainable copolymer has high rigidity, is soluble in a solvent, can easily be applied particularly when applied to a coating material, and a hard coating film can be obtained.

Among monomers (b) having the structure of the formula 1, a monomer (b2) of the formula 1 wherein Y is a crosslinkable functional group, is preferably a compound of the formula 1 wherein Y is a hydroxy group, a carboxy group or an amino group, more preferably a compound wherein Y is a hydroxy group. In the monomer (b2), R in the formula 1 is preferably a $C_{2-20}$ alkylene group which may have a branched structure and a cyclic structure, more preferably a linear alkylene group. The number of carbon atoms in such an alkylene group is preferably from 1 to 10, more preferably from 1 to 6, further preferably from 2 to 4. In the monomer (b2), Q in the formula 1 is preferably an oxygen atom.

The monomer (b2) is preferably a hydroxyalkyl vinyl ether, a hydroxyalkyl vinyl ester, a hydroxyalkyl allyl ether, a hydroxyalkyl allyl ester or a (meth)acrylic acid hydroxyalkyl ester.

The hydroxyalkyl and hydroxyallyl groups in the hydroxyalkyl vinyl ester and hydroxyalkyl allyl ester, are, respectively preferably, bonded to carbon atoms of the carbonyl groups of the ester bonds.

Specific examples of the monomer (b2) may preferably be a hydroxylakyl vinyl ether such as 2-hydroxyethyl vinyl ether (HEVE), hydroxymethyl vinyl ether (HMVE) or 4-hydroxybutyl vinyl ether (HBVE); a hydroxyalkyl allyl ether such as hydroxyethyl allyl ether; and a (meth)acrylic acid hydroxylalkyl ester such as hydroxyethyl(meth)acrylate. A hydroxyalkyl vinyl ether is more preferred, since it is excellent in copolymerizability, and the weather resistance of the coating film to be formed will be good. Particularly preferred is 4-hydroxybutyl vinyl ether (HBVE).

The amount of the monomer (b) to be used for the solution polymerization in the present invention is preferably from 70 to 30 mol % based on all monomers of the fluoroolefin (a) and the monomer (b). Accordingly, in a case where the monomer (b) is composed of at least one member selected from the group consisting of the monomer (b1) and the monomer (b2), the total amount of the monomer (b1) and the monomer (b2) to be used for the solution polymerization is preferably from 70 to 30 mol %, more preferably from 60 to 40 mol %, most preferably from 55 to 45 mol %, based on all monomers of the fluoroolefin (a) and the monomer (b). Further, the total amount of repeating units based on the monomer (b1) and the monomer (b2) to all repeating units contained in the fluoroolefin copolymer is likewise preferably from 70 to 30 mol %, more preferably from 60 to 40 mol %, most preferably from 55 to 45 mol %.

Further, in a case where a monomer other than the monomer (b1) and the monomer (b2) is used as the monomer (b) to be used for the solution polymerization, the amount of such another monomer to be used for the solution polymerization is preferably at most 20 mol %, more preferably at most 10 mol %, based on all monomers. The amount of repeating units based on such another monomer to all repeating units contained in the fluoroolefin copolymer is likewise at most 20 mol %, more preferably at most 10 mol %.

The amount of the monomer (b1) to be used for the solution polymerization in the present invention is preferably from 0 to 45 mol %, more preferably from 3 to 35 mol %, further preferably from 5 to 30 mol %, based on all monomers of the fluoroolefin (a) and the monomer (b).

Further, in the fluoroolefin copolymer obtained by the solution polymerization in the present invention, the amount of repeating units based on the monomer (b1) to all repeating units contained in the fluoroolefin copolymer is preferably from 0 to 45 mol %, more preferably from 3 to 35 mol %, further preferably from 5 to 30 mol %.

By incorporating the monomer (b1) to the fluoroolefin copolymer, it is possible to suitably adjust the hardness or flexibility of the coating film to be obtained. When the amount of the monomer (b1) is at most 45 mol %, the weather resistance will be good, and a sufficient amount of crosslinkable groups can be introduced into the copolymer in order to obtain a coating film having high hardness.

The amount of the monomer (b2) to be used for the solution polymerization in the present invention is preferably from 5 to 40 mol %, more preferably from 8 to 35 mol %, based on all monomers of the fluoroolefin (a) and the monomer (b).

Further, in the fluoroolefin copolymer obtained by the solution polymerization in the present invention, the amount of repeating units based on the monomer (b2) to all repeating units contained in the fluoroolefin copolymer is preferably from 5 to 40 mol %, more preferably from 8 to 35 mol %.

When the content of the monomer (b2) is at least 5 mol %, a sufficient amount of crosslinkable groups can be introduced into the copolymer in order to obtain a coating film having high hardness. Further, when the content of the monomer (b2) is at most 40 mol %, a sufficient low viscosity can be maintained as such a fluoroolefin copolymer solution even when it is of a high solid content type.

Monomers (b) to be used for the solution polymerization in the present invention may be used alone, or two or more of them may be used in combination. The monomers (b) in a case where two or more of them are used in combination, preferably contain both the monomer (b1) and the monomer (b2).

[Organic Solvent]

An organic solvent to be used for the solution polymerization (hereinafter referred to also as a polymerization solvent) is preferably at least one organic solvent (c) selected from the group consisting of a ketone solvent, an ether/ester solvent and a third-category organic solvent stipulated in Industrial Safety and Health Act. When the polymerization solvent is such an organic solvent (c), coloration of the fluoroolefin copolymer solution is likely to occur, and the effect by the present invention is particularly remarkable.

The ether/ester solvent is a compound having both an ether bond and an ester bond in its molecule.

With a view to reducing the environmental load, a solvent complying with PRTR Law and HAPs regulation, i.e. an organic solvent containing no aromatic ring is preferred. Further, in the classification of organic solvents in accordance with Industrial Safety and Health Act, an organic solvent classified in the third-category organic solvent is also preferred.

Specifically, it is preferred to use a ketone solvent, an ether/ester solvent or a paraffin solvent or naphthene solvent classified in the third-category organic solvent in Industrial Safety and Health Act, which is not governed by PRTR Law or HAPs regulation.

The ketone solvent is preferably acetone, methyl ethyl ketone (MEK), methyl amyl ketone (MAK), methyl isobutyl ketone, ethyl isobutyl ketone, diisobutyl ketone, cyclohexanone or isophorone.

The ether/ester solvent is preferably ethyl 3-ethoxypropionate (EEP), propylene glycol monomethyl ether acetate or methoxybutyl acetate.

The third-category organic solvent stipulated in Industrial Safety and Health Act is at least one solvent selected from the group consisting of gasoline, coal tar naphtha (including solvent naphtha), petroleum ether, petroleum naphtha, petroleum benzin, terpin oil and mineral spirit (including mineral thinner, petroleum spirit, white spirit and mineral turpentine).

As the third-category organic solvent stipulated in Industrial Safety and Health Act, mineral spirit (including mineral thinner, petroleum spirit, white spirit and mineral turpentine) is preferred, since the flash point is at least room temperature.

The polymerization solvent may contain, in addition to the organic solvent (c), other organic solvents. As such other organic solvents, an alcohol solvent, an ether solvent and an aromatic hydrocarbon solvent are preferred.

The alcohol solvent is preferably one having at most 4 carbon atoms, and specifically, ethanol, tert-butanol or isopropylalcohol is preferred.

The ester solvent is preferably methyl acetate, ethyl acetate, n-propyl acetate, isobutyl acetate or t-butyl acetate.

The aromatic hydrocarbon solvent is preferably toluene, xylene, ethylbenzene, aromatic petroleum naphtha, tetrarin, terpin oil, Solvesso #100 (registered trademark of Exxon Chemical Japan Ltd.) or Solvesso #150 (registered trademark of Exxon Chemical Japan Ltd.).

Among organic solvents other than the organic solvent (c), ethanol, tert-butanol, xylene, toluene, etc. are preferred.

As other organic solvents contained in the polymerization solvent in addition to the organic solvent (c), an alcohol solvent having at most 4 carbon atoms is particularly preferred. When the polymerization solvent contains an alcohol solvent having at most 4 carbon atoms, the polymerization reaction proceeds more smoothly, for example, since the solubility of potassium carbonate becomes high.

In the polymerization solvent to be used for the solution polymerization, the proportion occupied by the organic solvent (c) is preferably from 40 to 90 mass %, more preferably from 60 to 80 mass %. When the organic solvent (c) is at least 40 mass %, the solubility of the formed copolymer in the polymerization solvent will be good, and when it is at most 90 mass %, such a proportion is preferred from the viewpoint of both the effect of adding potassium carbonate and the post treatment efficiency.

[Hydrotalcite]

The hydrotalcite in the present invention is preferably $Mg_6Al_2(OH)_{16}$ $CO_3.4H_2O$ or $Mg_{4.5}Al_2(OH)_{13}.3.5H_2O$, since it is readily available.

The particle diameter of the hydrotalcite is preferably from 5 to 500 µm, more preferably from 5 to 110 µm. When it is at least 5 µm, removal by filtration will be easy. When it is at most 500 µm, the surface area per unit area is large, whereby the copolymerization reaction proceeds smoothly.

[Potassium Carbonate ($K_2CO_3$)]

As the potassium carbonate, a commercial product may be used. The particle diameter is preferably from 100 to 1,000 μm, more preferably from 100 to 600 μm. When it is at least 100 μm, the removal by filtration will be easy. When it is at most 1,000 μm, the surface area per unit area is large, whereby the copolymerization reaction proceeds smoothly.

Here, the methods for measuring the particle sizes of the hydrotalcite and the potassium carbonate are in accordance with JIS K0069 "Sieving test method for chemical products".

[Method for Producing Fluoroolefin Copolymer Solution]

In order to produce a fluoroolefin copolymer solution, firstly, at least fluoroolefin (a) and at least one monomer (b) other than the fluoroolefin (a) are subjected to a solution polymerization in a polymerization solvent. At that time, the potassium carbonate and the hydrotalcite are permitted to be present. Further, as the case requires, a polymerization initiator may be added.

With respect to the amounts of the potassium carbonate and the hydrotalcite to be used, their total mass is preferably from 0.5 to 10 mass %, more preferably from 0.8 to 5 mass %, based on the total mass (100 mass %) of the fluoroolefin (a) and the monomer (b). When the total mass of the potassium carbonate and the hydrotalcite is at least 0.5 mass %, the copolymerization reaction proceeds smoothly, and when it is at most 10 mass %, the filtration efficiency in the subsequent treatment step will be good.

The mass ratio of the potassium carbonate to the hydrotalcite i.e. potassium carbonate/hydrotalcite is preferably from 4/96 to 80/20, more preferably from 10/90 to 50/50. In the total mass (100 parts by mass) of the potassium carbonate and the hydrotalcite, when the potassium carbonate is at least 4 parts by mass, the storage stability of the copolymer solution will be good over a long period of time, and when the hydrotalcite is at least 20 parts by mass, such is effective to reduce the chromaticity of the copolymer solution.

The polymerization initiator may, for example, be an azo type initiator such as 2,2'-azobisisobutyronitrile, 2,2'-azobiscyclohexane carbonate nitrile, 2,2'-azobis(2,4-dimethylvaleronitrile) or 2,2'-azobis(2-methylbutyronitrile); or a peroxide type initiator, such as a ketone peroxide such as cyclohexanone peroxide, a hydroperoxide such as tert-butyl hydroperoxide, a diacylperoxide such as benzoyl peroxide, a dialkyl peroxide such as di-tert-butyl peroxide, a peroxyketal such as 2,2-di-(tert-butylperoxy)butane, an alkyl perester such as tert-butylperoxypivalate (PBPV), or a percarbonate such as diisopropyl peroxydicarbonate.

Specifically, it is preferred to carry out the solution polymerization by any one of the following methods.

(i) A method wherein all monomers, the polymerization solvent, the potassium carbonate, the hydrotalcite and the polymerization initiator are charged all at once, followed by polymerization. The order of charging may suitably be set.

(ii) A method wherein the monomer (b) and the polymerization initiator are continuously or dividedly added to a reactor charged with the polymerization solvent, the fluoroolefin (a), the potassium carbonate and the hydrotalcite. The monomer (b) and the polymerization initiator may be added together as mixed with the polymerization solvent, and the charging order may suitably be set.

(iii) A method wherein all monomers and the polymerization initiator are, respectively, continuously or dividedly added to a reactor charged with the polymerization solvent, the potassium carbonate and the hydrotalcite. The monomers and the polymerization initiator may be added together as mixed with the polymerization solvent, and the charging order may suitably be set.

(iv) A method wherein to a reactor charged with the polymerization solvent, the potassium carbonate and the hydrotalcite and further charged with a part of the fluoroolefin (a) and/or monomer (b), the rest of the fluoroolefin (a) and/or monomer (b) and the polymerization initiator are continuously or dividedly added. The rest of the fluoroolefin (a) and/or monomer (b), and the polymerization initiator, may be added together as mixed with the polymerization solvent, and the charging order may suitably be set.

After completion of the reaction, it is preferred to remove an insoluble substance in the obtained reaction solution. Specifically, it is preferred to carry out solid-liquid separation by e.g. filtration to remove hydrotalcite and potassium carbonate present as an insoluble substance in the reaction solution. If the solution is used for a coating material as it contains the hydrotalcite and the potassium carbonate, the appearance (gloss, transparency) of the coating film is likely to be deteriorated.

In a case where the polymerization solvent contains an alcohol type solvent, the solubility of potassium carbonate in the polymerization solvent is high, whereby it is not possible to remove potassium carbonate dissolved in the polymerization solvent even if solid-liquid separation is carried out. In order to remove potassium carbonate dissolved in the polymerization solvent, it is preferred that the alcohol type solvent is removed from the polymerization solvent to precipitate the potassium carbonate dissolved, followed by solid-liquid separation to remove the insoluble substance. For the removal of the alcohol type solvent, it is preferred to remove it by a reduced pressure distillation column, and for this purpose, it is preferred to use, as the alcohol type solvent, an alcohol type solvent having a boiling point lower than the polymerization solvent component (the organic solvent (c) or the like) other than the alcohol.

The number average molecular weight (Mn) of the fluoroolefin copolymer as measured by gel permeation chromatography (GPC) by using polystyrene as the standard substance, is not particularly limited. In a case where the fluoroolefin copolymer solution is to be used as a coating material, the number average molecular weight (Mn) of the fluoroolefin copolymer solution is preferably from 3,000 to 9,000. When Mn is at least 3,000, the obtainable coating film will be excellent in weather resistance, and when Mn is at most 9,000, a sufficient solubility can be realized even if the fluoroolefin copolymer is at a high concentration in the fluoroolefin copolymer solution or in the coating composition, and a low viscosity can be realized, such being desirable.

[Fluoroolefin Copolymer Solution]

The fluoroolefin copolymer solution obtained by the method of the present invention contains a fluoroolefin copolymer having constituting units derived from the fluoroolefin (a) and constituting units derived from the monomer (b), and the organic solvent used as the polymerization solvent. As mentioned above, in a case where the alcohol type solvent or the like is removed after the polymerization, the organic solvent is one having such a solvent removed from the polymerization solvent.

The solid content concentration in the fluoroolefin copolymer solution is not particularly limited. In a case where the solution is used as a coating material, it preferably has a suitable viscosity depending upon the coating method. For example, the solid content concentration is preferably within a range of from 40 to 80 mass %.

In the case of the fluoroolefin copolymer solution obtained by the method of the present invention, as the solution polymerization is carried in the presence of potassium carbonate and hydrotalcite, the coloration is suppressed, the chromaticity value representing the degree of coloration decreases, and good storage stability is obtainable.

Specifically, the chromaticity value of the fluoroolefin copolymer solution (Y) obtained in the presence of both potassium carbonate and hydrotalcite can be reduced to a level of from 30 to 60%, when the chromaticity value of a comparative solution (X) obtained in the absence of hydrotalcite and in the presence of potassium carbonate during the solution polymerization is 100%.

The chromaticity value in the present invention is a value 20 times the yellowness (YI value). The yellowness (YI value) is obtained by a measuring method by means of SM-3 color computer manufactured by Suga Test Instruments Co., Ltd. by introducing the measurement solution into a cell having a cell length of 10 mm, by an integrating sphere system transmission method, by setting the sample irradiation area to be $\phi$30 mm and by using a 50 W halogen lamp of 12 V as the power source. The closer the value of such yellowness to zero, the less the coloration.

Specifically, the method for preparing the above comparative solution (X) is carried out in the same manner as in the method for preparing the fluoroolefin copolymer solution (Y) except that no hydrotalcite is used, and the amount of potassium carbonate added for the solution polymerization is changed.

The amount of potassium carbonate at the time of preparing the comparative solution (X) is set so that the stability of the polymerization reaction will be substantially the same at the time of preparing the fluoroolefin copolymer solution (Y). That is, when the amount of potassium carbonate at the time of preparing the fluoroolefin copolymer solution (Y) is Y1, and the amount of hydrotalcite is Y2, the amount X1 of potassium carbonate to be used at the time of preparing the comparative solution (X) is set to be a value obtained by $X1=(Y1+Y2)/a$ ($a=1.6$ when the organic solvent (c) to be used for the polymerization reaction is a ketone solvent, $a=1.5$ when it is an ether/ester solvent, and $a=1.4$ when it is a third-category organic solvent stipulated in Industrial Safety and Health Act). The amount of potassium carbonate required for the polymerization reaction to proceed stably, varies depending upon the monomers or the type of the solvent to be used, and the above a value is one to define the amount of potassium carbonate required for the polymerization to proceed stably when any types of monomers are employed.

Further, the solid content concentrations in the comparative solution (X) and the fluoroolefin copolymer solution (Y) for comparison of the chromaticity are set to be the same. If required, the solid content concentration is adjusted by addition of the organic solvent (c) or by removing the organic solvent (c) by distillation under reduced pressure.

[Coating Material]

The fluoroolefin copolymer solution obtained by the method of the present invention can suitably be used for a coating material. Since coloration of the copolymer solution can be suppressed, it is particularly suitable for a clear coating material, a light-colored coating material, or the like.

The coating composition of the present invention contains the fluoroolefin copolymer solution obtained by the method of the present invention, and another coating material blend component (d).

[Another Coating Material Blend Component (d)]

Such another coating material blend component (d) includes, for example, a curing agent, an organic solvent, and a resin other than the fluoroolefin copolymer obtained by the method of the present invention. Two or more of them may be used in combination.

The coating composition of the present invention may be one-part type coating material or a two-part type coating material. In the case of a two-part type, a curing agent is mixed immediately before the use.

[Curing Agent]

The curing agent is preferably a curing agent cross-linkable with the crosslinkable group in the fluoroolefin copolymer.

In a case where the crosslinkable group is a hydroxy group, the curing agent is preferably e.g. a curing agent for coating material such as an isocyanate type curing agent, a block isocyanate type curing agent or a melamine type curing agent.

The isocyanate type curing agent is preferably a non-yellowing isocyanate such as hexamethylene diisocyanate or isophorone diisocyanate.

The block isocyanate type curing agent is preferably one having an isocyanate group of an isocyanate curing agent blocked with caprolactam, isophorone, $\beta$-diketone or the like.

The melamine type curing agent is preferably a melamine etherified by a lower alcohol such as melamine, an butylated melamine, an epoxy-modified melamine or the like.

The content of the curing agent in the coating composition of the present invention is from 1 to 100 parts by mass, more preferably from 1 to 50 parts by mass, per 100 parts by mass of the fluoroolefin copolymer in the coating composition.

When the curing agent is at least 1 part by mass, the obtained coating film will be excellent in solvent resistance, and the hardness will be sufficient. When the curing agent is at most 100 parts by mass, the processability will be excellent, and the impact resistance will be excellent.

[Organic Solvent]

At the time of preparing the coating composition, an organic solvent may further be added as another coating material blend component (d) to the fluoroolefin copolymer solution. Such an organic solvent may be the same organic solvent as the organic solvent used as the polymerization solvent, or a different organic solvent.

For example, it may be the above-mentioned organic solvent (c) or an organic solvent other than the organic solvent (c), such as xylene or toluene.

[Colorant]

The colorant may, for example, be an inorganic pigment such as carbon black or titanium oxide having good weather resistance; an organic pigment such as phthalocyanine blue, phthalocyanine green, quinacridone red, indanethrene orange or isoindolinone yellow; or a dye.

[Resin]

The resin to be incorporated as another coating material blend component (d) is a resin other than the fluoroolefin copolymer obtained by the method of the present invention, and a known resin to be incorporated to a coating material may suitably be used.

For example, in order to improve the drying property of a coating film, CAB (cellulose acetate butyrate), NC (nitrocellulose) or the like may be incorporated. Otherwise, in order to improve the gloss or hardness of the coating film, or the processability of the coating material, a polymer made of acrylic acid or its ester, or a coating resin such as a polyester may be incorporated.

[Other Components]

As other components, known components which are commonly incorporated to coating materials, such as a silane coupling agent, an ultraviolet absorber, a curing accelerator, a photostabilizer, a delustering agent, etc., may be incorporated, as the case requires.

As the method for applying the coating composition of the present invention, an optional method may be used such as spray coating, air spray coating, brush coating, dip coating, roll coater coating, flow coater coating.

The material for an article to be coated may, for example, be an inorganic material such as concrete, natural stones or glass; a metal such as iron, stainless steel, aluminum, copper, brass or titanium; or an organic material such as a plastic, rubber, an adhesive or wood.

Further, it is suitable also for coating organic/inorganic composite materials such as FRP, resin-reinforced concrete, fiber-reinforced concrete, etc.

Articles to be coated may, for example, be transport equipments such as automobiles, trains, aircrafts, etc.; civil engineering components such as bridge components or iron towers; industrial equipments such as waterproof sheets, tanks or pipes; building components such as building exterior, doors, window materials, monuments or poles; road members such as medians of roads, guard rails or sound-barriers; communication equipments; electric or electronic components; surface sheets or back sheets for solar cell modules, etc.

EXAMPLES

Now, the present invention will be described in further detail with reference to Examples and Comparative Examples. Here, parts and % are represented by mass unless otherwise specified.

A fluoroolefin copolymer solution was prepared with the blend proportions shown in Table 1. The unit for the proportion in the Table is parts by mass, and in the brackets ( ) in the sections for the fluoroolefin (a) and the monomer (b), the proportions (unit: mol %) based on the total amount (100 mol %) of the fluoroolefin (a) and the monomer (b) are indicated. In the brackets ( ) in the sections for potassium carbonate and hydrotalcite, the proportions (unit: mass %) based on the total mass (100 mass %) of the fluoroolefin (a) and the monomer (b) are indicated.

The composition of the obtained fluoroolefin copolymer is shown in Table 2.

Example 1

Into a stainless steel pressure resistant reactor having an internal capacity of 2,500 mL and provided with a stirrer, 623 g of ethyl 3-ethoxypropionate (EEP), 176 g of ethanol, 122 g of ethyl vinyl ether (EVE), 460 g of 4-hydroxybutyl vinyl ether (HBVE), 5 g of potassium carbonate (average particle diameter: 300 µm, the same applies hereinafter), 13 g of hydrotalcite (product name: KW500, manufactured by Kyowa Chemical Industry Co., Ltd., particle diameter: at most 45 µm 38%, from 45 to 75 µm 35%, from 75 to 106 µm 21%, from 106 to 500 µm 6%, the same applies hereinafter) and 7 g of perbutyl pivalate (PBPV) were charged, followed by pressurizing/purging by nitrogen and deaeration to remove dissolved oxygen in the solution. Then, 687 g chlorotrifluoroethylene (CTFE) was introduced, then the temperature was gradually raised, and a reaction was continued while maintaining the temperature at 75° C. After 12 hours, the reactor was cooled with water to terminate the reaction. This reaction solution was cooled to room temperature, then non-reacted monomers were purged, and the obtained reaction solution was distilled under reduced pressure to remove ethanol, followed by filtration by using diatomaceous earth as a filtering material to remove insoluble solid material, to obtain a fluoroolefin copolymer solution A-1 having a solid content concentration of 70%.

The number average molecular weight (Mn) of the obtained fluoroolefin copolymer was 5700.

Example 2

A fluoroolefin copolymer solution A-2 having a solid content concentration of 70% was obtained in the same manner as in Example 1 except that the blend proportions were changed as shown in Table 1. In this Example, instead of ethyl vinyl ether (EVE), 206 g of cyclohexyl vinyl ether (CHVE) was used.

The number average molecular weight (Mn) of the obtained fluoroolefin copolymer was 5200.

Example 3

In Example 1, the blend proportions were changed as shown in Table 1. In this Example, as the polymerization solvent, ethanol and mineral spirit A (product name, manufactured by NIPPON OIL CORPORATION) were used, and instead of ethyl vinyl ether (EVE), 240 g of cyclohexyl vinyl ether (CHVE) was used, and as the hydroxy group-containing monomer (b1), in addition to HBVE, 170 g of 2-ethylhexyl vinyl ether (2EHVE) was further used. Further, the reaction temperature was changed from 75° C. to 65° C.

Otherwise, in the same manner as in Example 1, a fluoroolefin copolymer solution A-3 having a solid content concentration of 60% was obtained. The number average molecular weight (Mn) of the obtained fluoroolefin copolymer was 8900.

Example 4

In Example 1, the blend proportions were changed as shown in Table 1. In this Example, as the polymerization solvent, ethanol and methyl ethyl ketone (MEK) were used, and as the monomer (b), ethyl vinyl ether (EVE) and cyclohexyl vinyl ether (CHVE) were used. Further, the reaction temperature was changed from 75° C. to 65° C.

Otherwise, in the same manner as in Example 1, a fluoroolefin copolymer solution A-4 having a solid content concentration of 60% was obtained. The number average molecular weight (Mn) of the obtained fluoroolefin copolymer was 8000.

Comparative Example 1

A fluoroolefin copolymer solution B-1 having a solid content concentration of 70% was obtained in the same manner as in Example 2 except that in Example 2, the amount of potassium carbonate added was changed to 12 g and no hydrotalcite was added. The number average molecular weight (Mn) of the obtained fluoroolefin copolymer was 5300.

Comparative Example 2

A fluoroolefin copolymer solution B-2 having a solid content concentration of 70% was obtained in the same manner as in Example 2 except that in Example 2, no potassium carbonate was added, and the amount of hydrotalcite added was changed to 13 g. The number average molecular weight (Mn) of the obtained fluoroolefin copolymer was 5000.

Comparative Example 3

A fluoroolefin copolymer solution B-3 having a solid content concentration of 60% was obtained in the same manner as in Example 3 except that in Example 3, the amount of potassium carbonate added was changed to 8 g and no hydrotalcite was added. The number average molecular weight (Mn) of the obtained fluoroolefin copolymer was 8800.

Comparative Example 4

A fluoroolefin copolymer solution B-4 having a solid content concentration of 60% was obtained in the same manner as in Example 4 except that in Example 4, the amount of potassium carbonate added was changed to 8 g and no hydrotalcite was added. The number average molecular weight (Mn) of the obtained fluoroolefin copolymer was 6900.

[Evaluation]

(Chromaticity of Fluoroolefin Copolymer Solution)

With respect to an obtained solution, the chromaticity was measured. That is, using SM-3 color computer manufactured by Suga Test Instruments Co., Ltd., the yellowness (YI value) was measured by a measuring method of introducing a measurement solution into a cell having a cell length of 10 mm, and 20 times the obtained yellowness (YI value) was taken as the chromaticity. The measured results are shown in Table 1.

(Stability of Fluoroolefin Copolymer Solution)

An obtained fluoroolefin copolymer solution was stored at 70° C. for 7 days, whereupon the solution was visually observed to evaluate the presence or absence of gelation.

Evaluation: ○ No gelation observed

X Gelation observed (Physical properties of coating film) To a stainless steel container, a fluorinated copolymer solution, a white pigment and a dispersant were added, and further to adjust the concentration, the same solvent as in each copolymer solution was added, and the same mass of glass beads were added. Then, a stirrer was put into the solution, and stirring was carried out at 1,200 rpm for 1.5 hours. Thereafter, a fluorinated copolymer was further added, and a curing agent and a curing catalyst were added to obtain a white coating material. The obtained white coating material was applied in a thickness of about 70 μm on the surface of an aluminum plate by means of an applicator and dried at room temperature for two weeks to obtain a coating film having a thickness of about 30 μm.

TABLE 1

| | | | | Ex. 1 | Ex. 2 | Ex. 3 | Ex. 4 | Comp. Ex. 1 |
|---|---|---|---|---|---|---|---|---|
| Blend proportions (parts) | (a) mol % in ( ) | | CTFE | 687 (51.1 mol %) | 662 (51.2 mol %) | 450 (51.5 mol %) | 438 (50.1 mol %) | 662 (51.2 mol %) |
| | (b) mol % in ( ) | (b1) | EVE | 122 (14.6 mol %) | 0 | 0 | 27 (5.0 mol %) | 0 |
| | | | CHVE | 0 | 206 (14.6 mol %) | 240 (25.2 mol %) | 237 (24.9 mol %) | 206 (14.6 mol %) |
| | | (b2) | HBVE | 460 (34.3 mol %) | 443 (34.2 mol %) | 77 (8.8 mol %) | 175 (20.0 mol %) | 443 (34.2 mol %) |
| | | (b1) | 2EHVE | 0 | 0 | 170 (14.5 mol) | 0 | 0 |
| | Potassium carbonate mass % in ( ) | | | 5 (0.39%) | 5 (0.38%) | 2 (0.21%) | 4 (0.46%) | 12 (0.91%) |
| | Hydrotalcite mass % in ( ) | | | 13 (1.02%) | 13 (0.99%) | 9 (0.96%) | 9 (1.03%) | 0 |
| | Another polymerization solvent | | Ethanol | 176 | 170 | 200 | 212 | 170 |
| | (c) | | EEP | 623 | 600 | 0 | 0 | 600 |
| | | | MEK | 0 | 0 | 0 | 752 | 0 |
| | | | Mineral spirit A | 0 | 0 | 700 | 0 | 0 |
| | Polymerization initiator | | PBPV | 7 | 7 | 7 | 7 | 7 |
| Fluoroolefin copolymer solution | | | | A-1 | A-2 | A-3 | A-4 | B-1 |
| Solid content concentration (mass %) | | | | 70 | 70 | 60 | 60 | 70 |
| Evaluation | Chromaticity | | | 70 | 110 | 18 | 201 | 360 |
| | Stability | | | ○ | ○ | ○ | ○ | ○ |

| | | | | Comp. Ex. 2 | Comp. Ex. 3 | Comp. Ex. 4 |
|---|---|---|---|---|---|---|
| Blend proportions (parts) | (a) mol % in ( ) | | CTFE | 662 (51.2 mol %) | 450 (51.5 mol %) | 438 (50.1 mol %) |
| | (b) mol % in ( ) | (b1) | EVE | 0 | 0 | 27 (5.0 mol %) |
| | | | CHVE | 206 (14.6 mol %) | 240 (25.2 mol %) | 237 (24.9 mol %) |
| | | (b2) | HBVE | 443 (34.2 mol %) | 77 (8.8 mol %) | 175 (20.0 mol %) |
| | | (b1) | 2EHVE | 0 | 170 (14.5 mol) | 0 |
| | Potassium carbonate mass % in ( ) | | | 0 | 8 (0.85%) | 8 (0.91%) |
| | Hydrotalcite mass % in ( ) | | | 13 (0.99%) | 0 | 0 |
| | Another polymer- | | Ethanol | 170 | 200 | 212 |

TABLE 1-continued

|  |  |  | | | |
|---|---|---|---|---|---|
| ization solvent (c) | | EEP | 600 | 0 | 0 |
| | | MEK | 0 | 0 | 752 |
| | | Mineral spirit A | 0 | 700 | 0 |
| Polymerization initiator | | PBPV | 7 | 7 | 7 |
| Fluoroolefin copolymer solution | | | B-2 | B-3 | B-4 |
| Solid content concentration (mass %) | | | 70 | 60 | 60 |
| Evaluation | | Chromaticity | —* | 56 | 371 |
| | | Stability | X | ○ | ○ |

*No data available

TABLE 2

|  |  |  |  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|---|---|
| Composition | (a) mol % | | CTFE | 55 | 55 | 53 | * | 55 | 55 | 53 | * |
| | (b) mol % | (b1) | EVE | 13 | 0 | 0 | * | 0 | 0 | 0 | * |
| | | | CHVE | 0 | 12 | 23 | * | 12 | 12 | 23 | * |
| | | (b2) | HBVE | 32 | 33 | 9 | * | 33 | 33 | 9 | * |
| | | (b1) | 2EHVE | 0 | 0 | 16 | 0 | 0 | 0 | 16 | 0 |

* No data available

From the results in Table 1, it is evident that the chromaticity of the fluoroolefin copolymer solution A-2 in Example 2 wherein copolymerization was carried out in the presence of potassium carbonate and hydrotalcite, is 31% to the chromaticity (100%) of the fluoroolefin copolymer solution B-1 in Comparative Example 1 wherein only potassium carbonate was present during the copolymerization, whereby coloration was substantially suppressed.

Likewise, the chromaticity of the solution A-3 in Example 3 was 32% of the chromaticity of the solution B-3 in Comparative Example 3, and the chromaticity of the solution A-4 in Example 4 was 54% of the chromaticity of the solution B-4 in Comparative Example 4.

Further, in Comparative Example 2 wherein only hydrotalcite was present and no potassium carbonate was present at the time of the copolymerization, the storage stability was no good.

Further, the coating films obtained from the solutions in Examples 1 to 4 were excellently white colored coating films.

This application is a continuation of PCT Application No. PCT/JP2010/052559, filed on Feb. 19, 2010, which is based upon and claims the benefit of priority from Japanese Patent Application No. 2009-039433 filed on Feb. 23, 2009. The contents of those applications are incorporated herein by reference in its entirety.

What is claimed is:

1. A method for producing a fluoroolefin copolymer solution, the method comprising:
    subjecting a fluoroolefin and a monomer other than the fluoroolefin to a solution polymerization in an organic solvent in the presence of potassium carbonate and hydrotalcite
    wherein a mass ration of the potassium carbonate to the hydrotalcite is from 4/96 to 80/20.
2. The method of claim 1,
    wherein the organic solvent comprises at least one organic solvent selected from the group consisting of a ketone solvent, an ether/ester solvent and a third-category organic solvent stipulated in Industrial Safety and Health Act.
3. The method of claim 2, wherein the organic solvent further comprises an alcohol solvent having at most 4 carbon atoms.
4. The method of claim 1,
    wherein a total mass of the potassium carbonate and the hydrotalcite is from 0.5 to 10 mass % of a total mass of the fluoroolefin and the monomer.
5. The method of claim 1, wherein the monomer is comprises cyclohexyl vinyl ether.
6. The method of claim 1, wherein the monomer comprises a hydroxyalkyl vinyl ether.
7. The method of claim 1, further comprising:
    filtrating a reaction solution obtained from the solution polymerization to remove an insoluble component.
8. The method of claim 1, wherein a chromaticity of the fluoroolefin copolymer solution is from 30 to 60% of a chromaticity of a comparative solution obtained by an otherwise identical process comprising solution polymerization in the presence of potassium carbonate but not hydrotalcite.
9. The method of claim 1, wherein a number of fluorine atoms in the fluoroolefin is 2 or more.
10. The method of claim 9, wherein the number of fluorine atoms in the fluoroolefin is from 2 to 6.
11. The method of claim 1, wherein the fluoroolefin comprises tetrafluoroethylene, chlorotrifluoroethylene, vinylidene fluoride, hexafluoropropylene, or any combination thereof.
12. The method of claim 1,
    wherein the monomer other than the fluoroolefin comprises a structure of formula 1:

$$CH_2=CX(CH_2)_n\text{-}Q\text{-}R\text{-}Y \qquad (1),$$

X is a hydrogen atom or a methyl group,
n is 0 or 1,
Q is an oxygen atom, —C(O)O— or —O(O)C—, R is an optionally branched, optionally cyclic $C_{2\text{-}20}$ alkylene group, and Y is a hydrogen atom or a crosslinkable functional group.

13. The method of claim 1, wherein the organic solvent is substantially free of any aromatic ring.

14. The method of claim 1, wherein the hydrotalcite has a particle diameter of from 5 to 500 µm.

15. The method of claim 1, wherein the potassium carbonate has a particle diameter of from 100 to 1,000 µm.

16. The method of claim 1, wherein the mass ratio of the potassium carbonate to the hydrotalcite is from 10/90 to 50/50.

17. The method of claim 1, wherein the solution polymerization is in the presence of a polymerization initiator.

18. A method for producing a coating composition, comprising:
    producing a fluoroolefin copolymer solution by the method of claim 1, and then
    blending a second coating material blend component to the fluoroolefin copolymer solution.

19. The method of claim 18, wherein the second coating material blend component is at least one selected from the group consisting of an organic solvent, a curing agent, a colorant and a resin other than the fluoroolefin copolymer.

* * * * *